Oct. 16, 1928.
1,687,941
E. KOENEMANN
STEAM AND OTHER VAPOR POWER PLANT UTILIZING
CAUSTIC SODA OR OTHER AUXILIARY FLUIDS
Filed Nov. 10, 1925
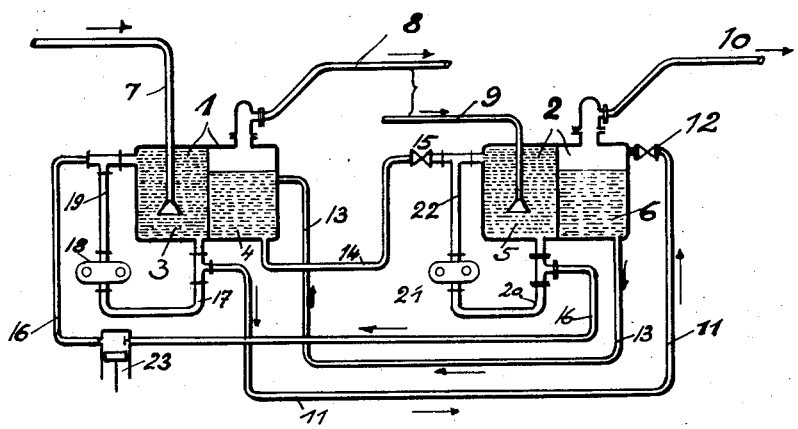
INVENTOR
Ernst Koenemann
BY
ATTORNEY Patented Oct. 16, 1928.

1,687,941

UNITED STATES PATENT OFFICE.

ERNST KOENEMANN, OF BERLIN, GERMANY.

STEAM AND OTHER VAPOR POWER PLANT UTILIZING CAUSTIC SODA OR OTHER AUXILIARY FLUIDS.

Application filed November 10, 1925, Serial No. 68,241, and in Germany November 12, 1924.

It is already known to lead steam and an auxiliary fluid into a mixing vessel, then to lead the auxiliary fluid, directly, or after passing through a further mixing vessel, into one or more than one evaporator and finally to re-introduce it into the original mixing vessel. In such an apparatus a mixing vessel and an evaporator are always separated by a hot surface. This arrangement renders it possible to effect a transformation of quantities of heat of high temperature and quantities of heat at a lower temperature into quantities of heat having an intermediate temperature.

In an apparatus of the kind above referred to, the quantity of fluid flowing through the mixer can be heated to the boiling point of the fluid by the addition of steam corresponding to the pressure. The arrangement has however the disadvantage that the quantity of fluid streaming through the mixing vessel is necessarily very small, or otherwise the power of the pump which supplies or delivers the mixing fluid at the pressure of the evaporator will be excessive. Moreover, the degree of dilution of the fluid admissible in each mixer on account of the temperatures, places certain limits to an increase in the quantity of fluid streaming through the mixer.

Because of this small quantity of fluid, it is impossible to reach the temperature ordinarily obtainable by mixing per se because it is difficult to mix small quantities of fluid intimately with large quantities of steam. Furthermore, it is to be understood that the temperature obtained by mixing appears only at one place or position of the heating surface, viz., in the neighbourhood of or adjacent to the fluid inlet, while the other parts of the heating surface are heated by fluid of lower temperature. There results therefore a drop in temperature which produces a considerable deterioration in the efficiency of the plant or installation. Moreover, this small quantity of fluid restricts the number of heat exchangers, because this is dependent on the velocity of the fluid on the heating surface, and as the area of the heating surface is itself restricted by the cost of the plant or installation inefficient heat exchange will necessitate large temperature differences of the heating surface, which obviously results in a loss.

All of the disadvantages above mentioned are overcome by the apparatus of the present invention, in that a separate or special circulation is produced in the mixing vessel or vessels into which the steam in the fluid is introduced which combines in a known manner in the mixing vessel with a stream of fluid circulating between mixing vessel or vessels and evaporator or evaporators.

The accompanying drawing illustrates diagrammatically by way of example, two units of a plant embodying the present invention.

Referring to the drawing, the units are designated 1 and 2 respectively, each of which comprises a mixing vessel and an evaporator. The mixing vessels are designated 3 and 5 respectively, each of said vessels being normally maintained filled with an auxiliary fluid such for instance as soda lye. Adjacent to each of the mixing vessels 3 and 5 is supported an evaporator, designated herein 4 and 6 respectively, the evaporators being separated from their respective mixing vessels by a single wall or partition adapted to form a heating surface between the mixing vessel and evaporator.

The evaporator 3 communicates with the upper portion of evaporator 6 by means of a pipe 11, provided with a throttle valve 12 for controlling such communication, and the evaporator 6 in turn communicates with the evaporator 4 by means of a pipe 13. Again, the evaporator 4 communicates with the upper portion of the mixing vessel 5 by means of a pipe 14 provided with a throttle valve 15 for controlling such communication, and the mixing vessel 5 communicates with the upper portion of the mixing vessel 3 by means of a pipe 16 which pipe includes a pump 23.

In addition to the main circuits above described, a subsidiary circuit is provided which comprises a pipe 17 communicating with the lower portion of the mixing vessel 3 and with a pump 18, the latter in turn communicating by means of a pipe 19 with the upper portion of mixing vessel 3. In like manner, a pipe 20 communicates with the bottom portion of mixing vessel 5 and with a pump 21, which in turn communicates by means of a pipe 22 with the upper portion of mixing vessel 5. It will be observed that both of these subsidiary circuits are in communication with the pipes 11, 14 and 16 of the main circuits, thereby maintaining a large circulating body of fluid in the mixing vessels thus ensuring an intimate admixture of the steam and auxiliary fluid and a high velocity of the fluid on the heating surfaces between the mixing vessels and evaporators.

A pipe 7 communicating at one end with a source of steam supply (not shown) extends down through the auxiliary fluid contained in the mixing vessel 3, preferably to a point near the bottom of the vessel said pipe being provided with a distributing nozzle, as shown in the drawing. A steam pipe 8 communicates with the upper portion of the evaporator 4 and is adapted to carry steam from said evaporator to a power machine (not shown), where it is utilized for operating said machine, and is afterwards exhausted through a pipe 9 which passes downward through the auxiliary fluid in the mixing vessel 5 to a point near the bottom of said vessel and is, like the pipe 7, provided with a distributing nozzle. A pipe 10 communicates with the upper portion of evaporator 6 and is adapted to carry away steam from said evaporator. The apparatus herein described is intended to be so designed that the pressure in the pipe 7 is higher than in pipe 8, so that the degree of concentration of the auxiliary fluid contained in the mixer 3 may be less than in the other vessels.

The operation of the apparatus is as follows: Steam under comparatively high pressure is injected or otherwise introduced into the mixing vessel 3 through pipe 7 and mixes with the fluid in said vessel. The heat thus liberated is transmitted to the fluid in the evaporator 4 by means of the partition between said evaporator and mixing vessel, and produces superheated steam in said evaporator, which steam is carried by pipe 8 to an engine or other place of use, and after use is led by pipe 9 into mixing vessel 5, where it mixes with the auxiliary fluid in said vessel, the heat thus liberated being transmitted to the fluid in the evaporator 6 thereby producing steam in said evaporator, which steam being led away by pipe 10 for further use or to a condensor.

In the meantime, because of the introduction of high pressure steam into the mixing vessel 3 the fluid in said vessel becomes diluted and is caused to flow through the pipe 11 into the evaporator 6, the rate of flow being controlled by the valve 12 whereby the pressure in the evaporator 6 is maintained below that in the mixing vessel 3 in order to prevent filling of said evaporator to too great a height. The fluid then passes from the evaporator 6 through pipe 13 into evaporator 4, from whence it passes through pipe 14 into mixing vessel 5, its passage being controlled by throttle valve 15 whereby the pressure in said vessel is maintained below that in the evaporator 4. In the mixing vessel 5 the fluid becomes mixed with the steam delivered by the pipe 9, whereby it is diluted and its volume increased. From the mixing vessel 5 the fluid is returned to the mixing vessel 3 through the pipe 16. However, owing to the fact that the pressure in the vessel 3 is very much greater than that in vessel 5 the fluid cannot flow from 5 to 3 under its own pressure but is transferred by the action of pump 23.

From the foregoing it will be obvious that during the circulation of the fluid through the evaporators 6 and 4 the concentration of the fluid will be increased and during its passage through the mixing vessels 5 and 3 the concentration will be reduced, that is, the fluid will be diluted. It will therefore be readily seen that, by reason of the circulation described, the degrees of concentration in the individual receptacles will be automatically regulated. Moreover, because of the intimate admixture made possible by the subsidiary circuits hereinbefore described the operation can be carried on right up to the boiling point of the auxiliary fluid and injurious or objectionable temperatures avoided, while the high velocity of the auxiliary fluid in the mixing vessels yields an efficient heat exchange and renders possible the use of comparatively small heating surfaces.

What I claim is:

1. An apparatus of the character described, comprising in combination, a mixing vessel and an evaporator disposed in contiguous relation to each other, said mixing vessel being adapted to contain an auxiliary fluid, means for introducing a vapor under pressure into said mixing vessel, means in communication with said evaporator for discharging steam therefrom, a main circulatory system between said mixing vessel and evaporator whereby the fluid in the mixing vessel is caused to flow into the evaporator and thence back into the mixing vessel, and a subsidiary circuit for causing circulation of the fluid in said mixing vessel, said subsidiary circuit being in communication with said main circulatory system.

2. An apparatus of the character described, comprising in combination, a plurality of mixing vessels adapted to contain an auxiliary fluid, a plurality of evaporators one disposed in contiguous relation to each of said mixing vessels, means for introducing a vapor under pressure into one of said mixing vessels, means in communication with each of said evaporators for discharging steam therefrom, a main circulatory system between said mixing vessels and evaporators whereby under said introduced pressure the fluid in the mixing vessels is caused to flow from the first mixing vessel through the evaporators and the other mixing vessels and is returned to said first mixing vessel, and a subsidiary circuit associated with each of said mixing vessels for causing circulation of the fluid in said mixing vessels, said subsidiary circuits being in communication with said main circulatory system.

In testimony whereof I have signed my name to this specification.

ERNST KOENEMANN.